(12) United States Patent
Rijhsinghani et al.

(10) Patent No.: US 7,764,611 B2
(45) Date of Patent: Jul. 27, 2010

(54) SHARING OF NETWORK SECURITY AND SERVICES PROCESSING RESOURCES

(75) Inventors: Anil Rijhsinghani, Westborough, MA (US); Mohnish Anumala, Littleton, MA (US); Debin Zhang, Littleton, MA (US)

(73) Assignee: Avaya Inc., Basking Ridge, NJ (US)

( * ) Notice: Subject to any disclaimer, the term of this patent is extended or adjusted under 35 U.S.C. 154(b) by 59 days.

(21) Appl. No.: 12/317,526

(22) Filed: Dec. 23, 2008

(65) Prior Publication Data

US 2010/0158003 A1     Jun. 24, 2010

(51) Int. Cl.
*G01R 31/08* (2006.01)
(52) U.S. Cl. .................. 370/230; 370/235; 370/389; 370/401
(58) Field of Classification Search .................. None
See application file for complete search history.

(56) References Cited

U.S. PATENT DOCUMENTS

2003/0123447 A1* 7/2003 Smith .................. 370/394
2003/0189931 A1* 10/2003 Barri et al. .................. 370/389

* cited by examiner

*Primary Examiner*—Bob A Phunkulh

(57) ABSTRACT

Systems and methods are disclosed of routing traffic in a network that include classifying incoming data packets using the content of the incoming data packets that remains relatively consistent during a network session. These systems and methods also include ordering the incoming traffic according to at least one internet protocol address comprised within the incoming traffic, hashing the at least one internet protocol address and the destination port within the incoming traffic, and determining a destination service module for the incoming traffic. Through these systems and methods, data can be routed without the need for complete flow tables.

20 Claims, 6 Drawing Sheets

| IP Route (202) | IP Precedence (204) | SM # (206) |
|---|---|---|
| Clients (208) | High (214) | SM #1 (220) |
| Servers (210) | Medium (216) | SM #2 (222) |
| NAT (212) | Low (218) | SM #3 (226) |

SHARING OF NETWORK SECURITY AND SERVICES PROCESSING RESOURCES

CROSS-REFERENCE TO RELATED APPLICATION

Not Applicable.

TECHNICAL FIELD

The present invention relates generally to communication systems, and more particularly to routing network traffic in environments with multiple service modules.

BACKGROUND

A given network may provide a number of services for users through various security and services processing accelerator modules. These service modules can perform various functions, through a variety of protocols. Services provided by the service modules may include Firewall, server load balancing (SLB), intrusion protection services, as well as other services.

In environments that have multiple service modules and multiple I/O modules, it may be advantageous to route all traffic received on all I/O module within a network session related to a particular service to a single service module. In addition, traffic in the receive direction corresponding to that session received on any I/O module must be routed to the same module. In order to accomplish this routing, a complete flow routing table may be required at every I/O module. This complete flow routing table requires considerable computer resources and may comprise millions of entries at every I/O module. The use of such a flow table may also introduce other problems into the network, such as synchronization of tables at all I/O modules and service modules, and delay created by the system when accessing the flow routing table. In order to circumvent such stringent requirements, systems and methods that can be used to efficiently route traffic to a number of service modules without the need of a full flow routing table are needed.

SUMMARY

In accordance with one embodiment, a method is disclosed of routing traffic in a network that includes classifying incoming data packets using the content of the incoming data packets that remains relatively consistent during a network session. This method also includes ordering the incoming traffic according to at least one Internet protocol address comprised within the incoming traffic, hashing the at least one internet protocol address and the destination port within the incoming traffic, and determining a destination service module for the incoming traffic.

In accordance with another embodiment, a system is disclosed that includes an ingress network processing unit, a plurality of service modules connected to the ingress network unit, and an egress network processing unit connected to the plurality of service modules. In this system, the ingress network processing module examines the destination information of at least one incoming data packet and routes the at least one incoming data packet to one of the plurality of service modules based upon destination information of the at least one incoming data packet, and the at least one of the plurality of service modules processes the at least one incoming data packet and transmits the at least one data packet to the egress network processing unit.

In yet another embodiment, a method of routing traffic in a network is disclosed that includes selecting destination data parameters that remain consistent throughout a session and classifying network traffic based upon the selected destination data parameters. This method also includes ordering the incoming traffic according to at least one destination data parameter comprised within the network traffic using a precedence table and determining a destination service module for the incoming traffic.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The use of a number of service modules allows for a network to provide scalable and high-performance service processing capability, and a plurality of dissimilar services to users through a number of different service modules. In order to accomplish this routing, data must be evaluated for the appropriate service module capable of handling the data. Unlike data routing where traffic may be routed based solely upon the Internet protocol (IP) information, in systems utilizing a number of service modules, the destination as well as the service requested by the incoming data need to be identified.

There are several problems that make it difficult to make this identification, including the physical limitations of the system. These limitations include the limited table memory available to routing data. In addition, packets corresponding to the reverse side of a flow should be sent to the same service module as packets on the forward side of the flow that further complicates routing. Also, it may be advantageous to make optimal use of available service processing bandwidth by distributing traffic to available service modules. Ensuring consistency in data routing is difficult and resource intensive.

In order to overcome this problem, a network processing unit (NPU), is enhanced with additional systems and methods used determine how to distribute and route packets. These systems and methods takes into account the various issues involved with workload distribution and allow for the efficient routing of data traffic. As will be disclosed below, the additional systems and methods may be implemented at a node that routes data to a plurality of service modules, and is capable of ensuring that data that enters the system is routed to the appropriate service module for processing.

Figure 1:
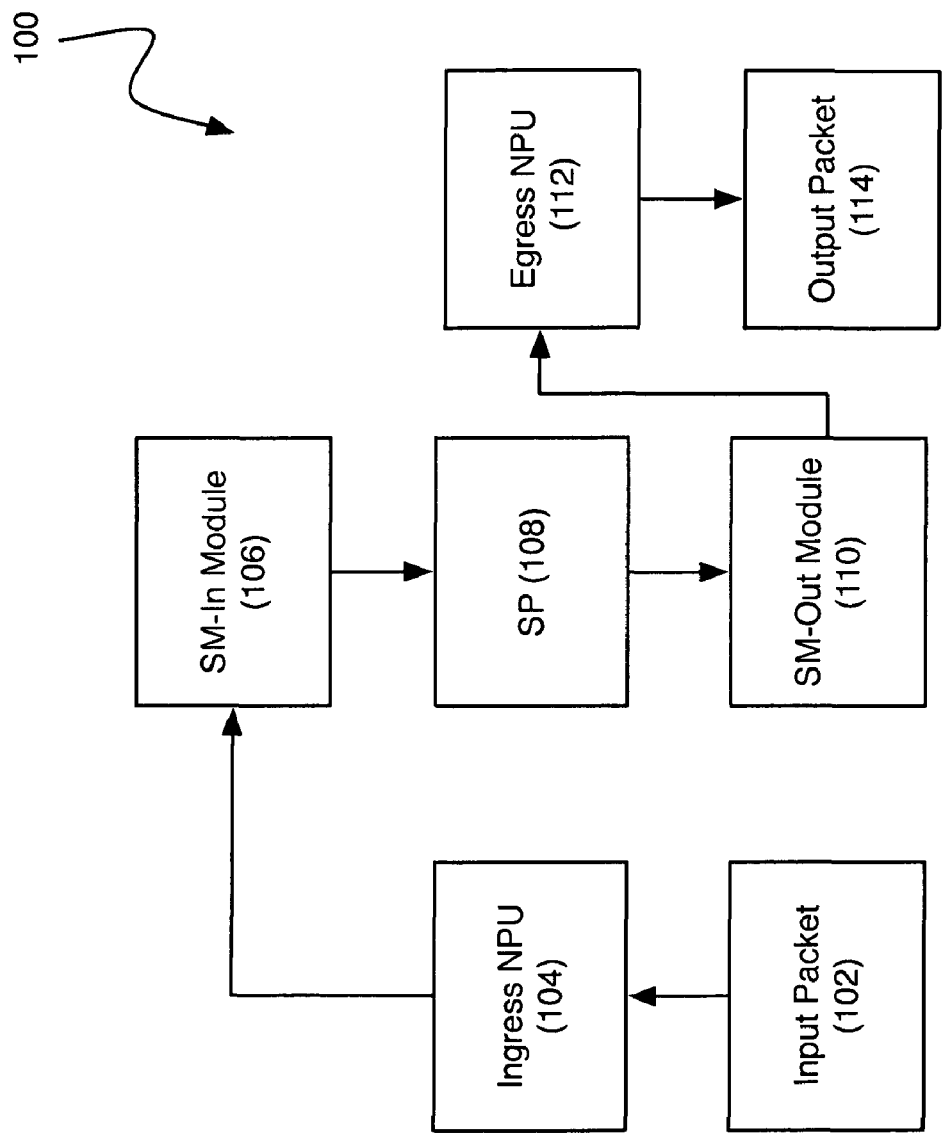
FIG. 1 depicts a high level diagram of a system with an ingress network processing unit (NPU) and a service module (SM)

FIG. 1 is an overview of one system 100 using a service module and an ingress/egress network processing unit (NPU). In this embodiment, an ingress NPU is connected to a service module (SM) input module 106, a service provider (SP) 108, a SM output module 110, and an egress NPU 112. Data enters the system through the ingress NPU 106, is processed, and exits through the egress NPU 112.

In this embodiment, an input packet 102 is transmitted to ingress NPU 104. Ingress NPU 104 decides how to route the input packet 102. In the example illustrated by system 100, only one destination is shown. However, as will be explained in FIG. 3, a plurality of SMs may be present within system 100. Ingress NPU provides for flow classification and distribution, ensures that reverse flow is mapped to same SM as forward flow of the corresponding session, and ensures that child flows are mapped to the same SM in both directions.

Ingress NPU 104 provides a number of functions when routing traffic. Ingress NPU 104 classifies, orders, hashes, and then determines the destination SM of the incoming data.

In one embodiment, the ingress NPU 104 classifies the incoming packet 102 by examining the incoming packet 102 to determine the destination service module for the packet. The destination information obtained through the ingress NPU 104 may be determined through the virtual routing and forwarding (VRF) rules, source IP (SrcIP), destination IP (DstIP), transmission control protocol (TCP) and user datagram protocol (UDP) ports of a packet, or a deterministic combination thereof to determine which services are required for this packet and which SM to send the packet to. Each of these elements may be referred as destination parameters, or collectively as the destination information. The phrase "static destination information" is intended to refer to the destination parameters within incoming packet 102 that remains relatively consistent throughout a data session.

The ingress NPU 104 orders the incoming traffic according to the destination information of the packets. In one embodiment, the ordering is preformed using the destination IP address and port destination of the incoming traffic. This can occur upon the determination by the NPU that the destination IP and port information are unchanged for both directions of the session, and that these fields can be used to deterministically identify the SM at which all processing for the session should occur.

Figure 2:
FIG. 2 is a block diagram of a routing table that is used by the ingress NPU shown in FIG. 1.

In some embodiments, the ordering may be based upon a precedence table. A precedence table ranks addresses by the assuming that a particular address will correspond to a particular service. It understood that addresses, which are unlikely to change within a session, may be ranked higher than those that are more dynamic. For instance, if a destination is a client and the source a server, the ingress NPU may determine that the destination is a more reliable indicator of the SM than the source. For example, a known web server with a port 80, the ingress NPU may determine that a client is seeking access to an Internet web server. In other embodiments, the ingress NPU 104 may identify the incoming source address, and use this information to determine what destination SM to route traffic to. An example precedence table is shown in FIG. 2.

Figure 5:
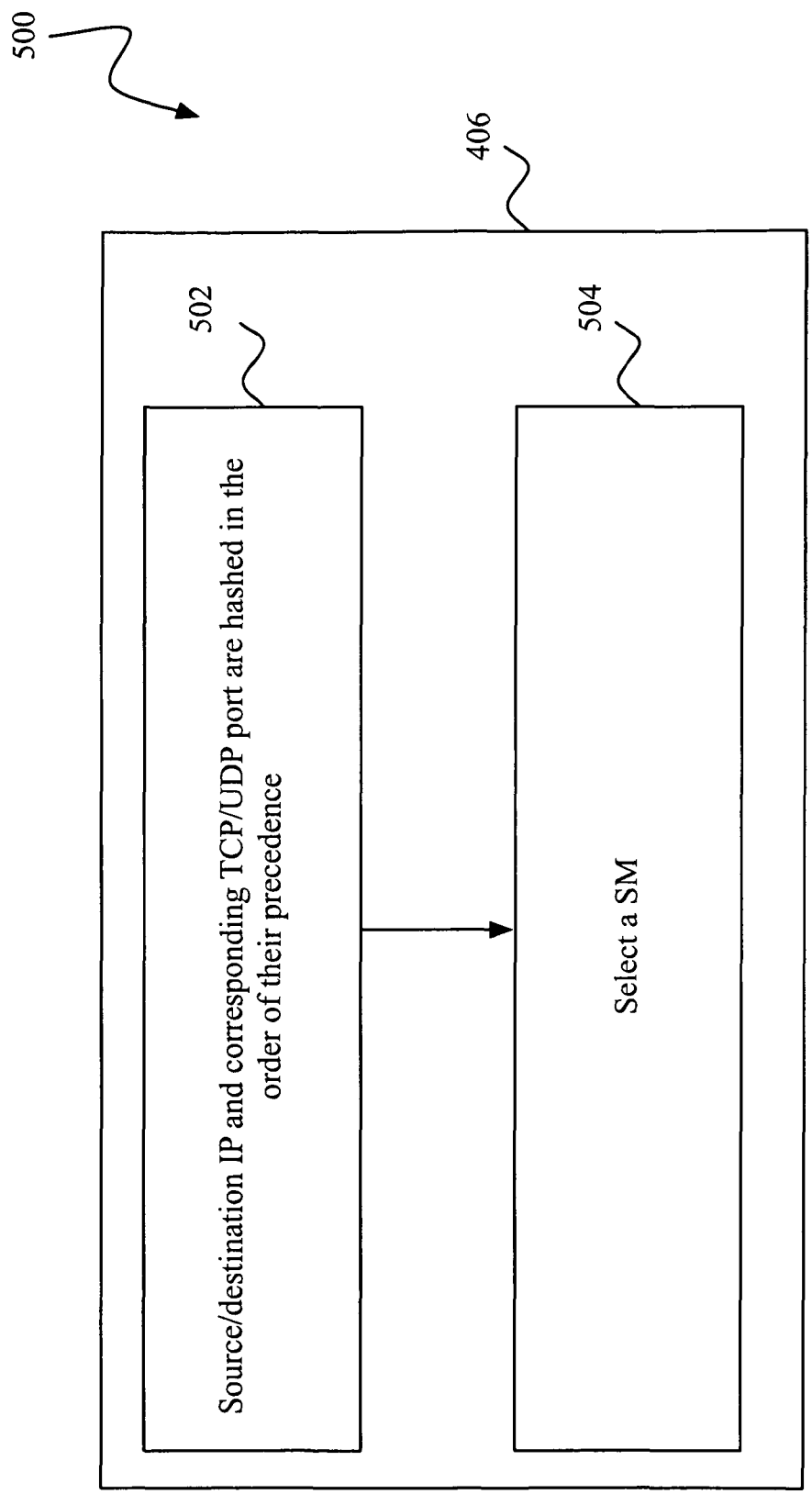
FIG. 5 is a flowchart of one method of load balancing using the disclosed systems and methods.

The way that the data is hashed may be dependant upon the type of service present. For instance, for a session that requires server load balancing, the destination IP address and port are likely to be changed during the load balancing process. In this case, the client IP address and port number will have a higher precedence when calculating a hash. FIG. 5 discusses creating the hash in more detail. It should be understood that the hash may be used to achieve a granular distribution of traffic for various purposes, including load sharing.

Ingress NPU 104 can then determine the destination SM based upon the classification, order, and hashing of the determined destination information. Ingress NPU 104 then routes data to the SM-In module 106. SM-In module 106 transmits the data to SP 108 that processes the input packet 102. SM-out module 110 accepts the output from SP 108 and transmits the result to egress NPU 112. Egress NPU 112 and transmits the data as output packet 114.

It is expressly understood that one, or more, of the blocks depicted in FIG. 1 may be integrated into a service module. The depiction in FIG. 1 is to provide clarity, and it is understood that any one, or more, of the SM-In module 106, SM-Out module 110, or SP 108 may be integrated into a single SM or service unit.

FIG. 2 is an illustration of one embodiment of a precedence table 200, showing the IP Route 202, IP Precedence 204, and SM #206. In this table, clients 208 have a high 214 precedence and are routed to SM #1 220. Servers 210 have a medium precedence 216 and are routed to SM #2 222. Network address translations (NAT) 212 have a low priority 218 and are routed to SM #3. It is understood that the IP route selected for the SM determination may correspond to any element of the information discussed above. The precedence table 200 allows for the identification of unchanging fields in a packet. These unchanging fields allow for the selection of a consistent SM for all packets in a corresponding session by the Ingress NPM 104.

Figure 3:
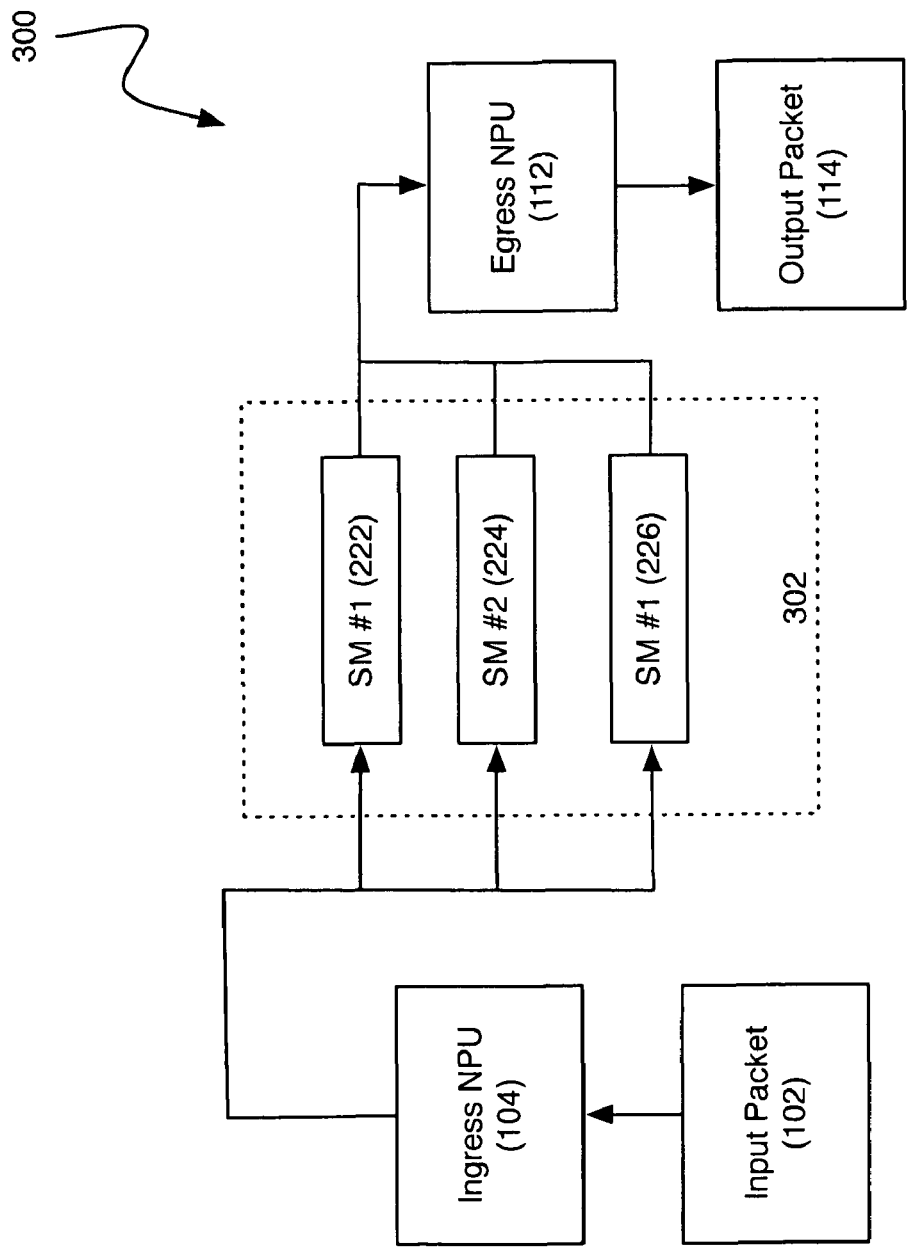
FIG. 3 is a block diagram of a system with a plurality of service modules.

FIG. 3 is a system 300 with a plurality of SMs. This figure is substantially similar to FIG. 1, except that a plurality of SMs 302 are present. In this embodiment, ingress NPU 104 routes traffic to the various SMs 302 (e.g., 222, 224, 226) based upon the precedence table shown in FIG. 2. Each SM transmits data to egress NPU 112, and egress NPU outputs output packet 114.

Figure 4:
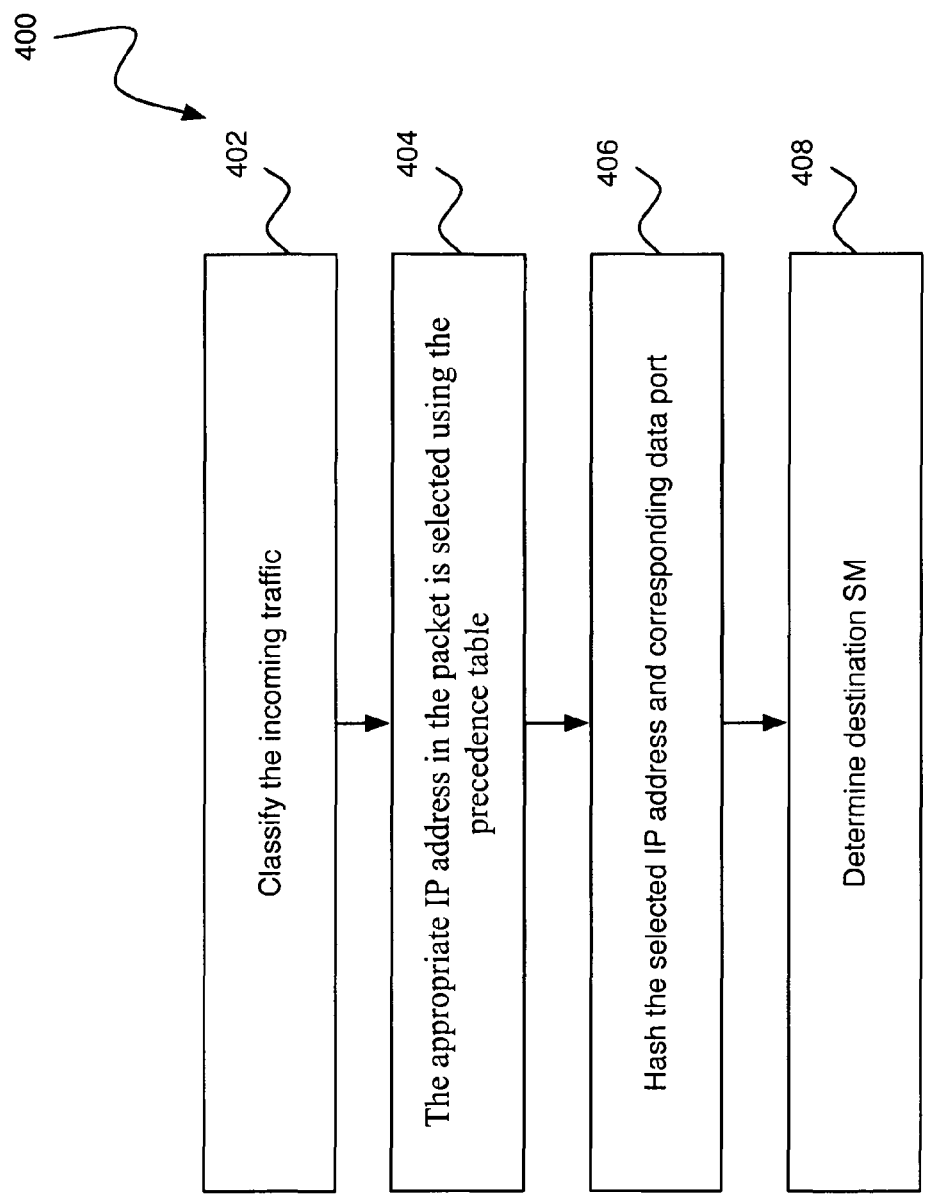
FIG. 4 is a flowchart of the processing and routing of traffic coming into the ingress NPU.

In FIG. 4, a method 400 of routing network traffic is shown. In block 402, the ingress NPU 104 classifies the incoming data. Flow classification is done at ingress NPU 104 by examining the virtual routing and forwarding (VRF) rules, source IP (SrcIP), destination IP (DstIP), TCP/UDP ports of a packet to determine which services are required for this packet and which SM lane to send the packet to.

In block 404, the IP addresses are selected based upon the precedence as looked up in the precedence table. Addresses that are not subject to load balancing and have a static destination are ordered before those that are being load balanced. In addition, destination addresses as well as the source IP address may also be ordered according to the priority listed in the precedence table, as illustrated by FIG. 2.

In block 406, the selected IP addresses and corresponding data ports are hashed. One of the innovative elements of the present disclosure is that a flow table is not required at each NPU and I/O module in order to determine how to route the data. Moreover, the systems and methods disclosed herein remove the requirement that the current data session needs to be identified prior to routing, as the appropriate destination may be determined through the precedence table. In block 408, the destination SM is determined and data is routed.

FIG. 5 is an example 500 of hashing and load balancing used within the present system. Within block 406, block 502 shows that incoming traffic source/destination IP and, in some embodiments, corresponding TCP/UDP port are hashed to identify the session. The order of the hashing is done according to the priority established in the precedence table. Using this result, the destination SM for this particular packet may be determined. It is further contemplated that the system may load balance using the information obtained from the hashes created by block 406. As show by FIG. 5, the hashing may be used not only for routing data but also for load balancing data among a plurality of SM modules.

Figure 6:
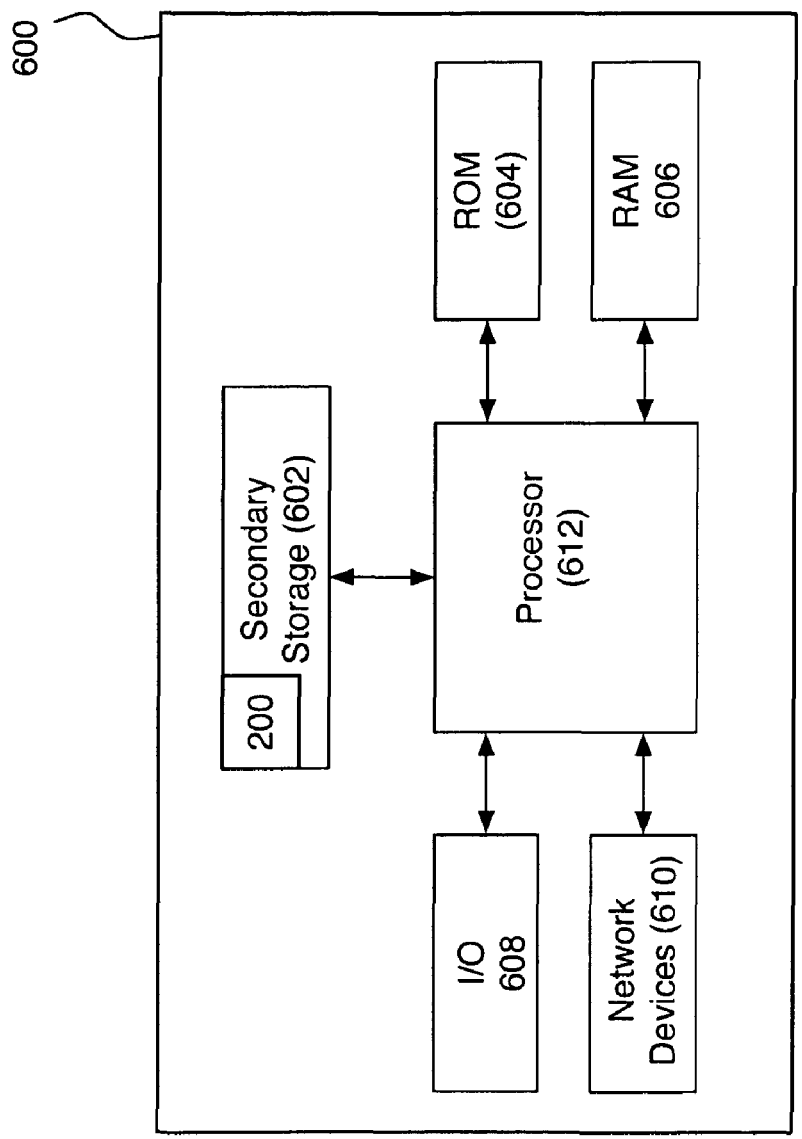
FIG. 6 is a block diagram of an exemplary general-purpose computer system suitable for implementing the several embodiments including the ingress NPU of the disclosure.

Any element of the disclosed system, including ingress NPU 104, described above may be implemented on any general-purpose computer 600 with sufficient processing power, memory resources, and network throughput capability to handle the necessary workload placed upon it. FIG. 6 illustrates a typical, general-purpose computer system suitable for implementing one or more embodiments disclosed herein. The general-purpose computer 600 includes a processor 612 (which may be referred to as a central processor unit or CPU or a network processing unit or NPU) that is in communication with memory devices including secondary storage 602, read only memory (ROM) 604, random access memory (RAM) 606, input/output (I/O) 608 devices, and network connectivity devices 610. The processor may be implemented as one or more CPU chips.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602. Secondary storage may comprise precedence table 200

I/O 608 devices may include printers, video monitors, liquid crystal displays (LCDs), touch screen displays, keyboards, keypads, or other well-known input devices. The network connectivity devices 610 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 610 may enable the processor 612 to communicate with an Internet or one or more intranets. With such a network connection, it is contemplated that the processor 612 might receive information from the network, or might output information to the network in the course of performing the above-described method steps. Such information, which is often represented as a sequence of instructions to be executed using processor 612, may be received from and outputted to the network, for example, in the form of a computer data signal embodied in a carrier wave.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of routing traffic in a network, the method comprising:
    classifying incoming data packets, wherein the classification is based on the content of the incoming data packets that remains consistent during a network session;
    ordering the data packets according to at least one internet protocol address comprised within the incoming data packets;
    hashing the at least one internet protocol address and the destination port within the incoming data packets;
    determining a destination service module for the incoming data packets using the hash created by the at least one internet protocol address and the destination port within the incoming data packets; and
    routing the incoming traffic.

2. The method of claim 1, wherein ordering the incoming data packets further comprises using a precedence table.

3. The method of claim 2, further comprising determining if a session is present.

4. The method of claim 3, wherein if a session is present routing the incoming traffic according to the existing session.

5. The method of claim 1, wherein the data packets are routed to one of a plurality of service modules.

6. The method of claim 1, wherein the data packets are routed from one of the plurality of service modules to an egress network processing unit.

7. A system, comprising:
    an ingress network processing unit;
    a plurality of service modules connected to the ingress network unit;
    an egress network processing unit connected to the plurality of service modules, wherein the ingress network processing module classifies incoming data packets, wherein the classification is based on the content of the incoming data packets that remains consistent during a network session, orders the data packets according to at least one internet protocol address comprised within the incoming data packets, hashes the destination information of the at least one incoming data packet, examines the destination information of at least one incoming data packet and routes the at least one incoming data packet to one of the plurality of service modules based upon static destination information of the at least one incoming data packet, and the at least one of the plurality of service modules processes the at least one incoming data packet and transmits the at least one data packet to the egress network processing unit.

8. The system of claim 7, wherein the ingress module routes the at least one incoming data packet by determining the priority of the destination information of the at least one incoming data packet.

9. The system of claim 7, wherein the ingress module determines if a session is in progress prior to routing the data.

10. The system of claim 7, wherein the ingress module comprises a precedence table.

11. The system of claim 7, wherein the ingress module comprises a hash table.

12. The system of claim 11, wherein the hash table is used to route the at least one incoming data packet.

13. A method of routing traffic in a network, the method comprising:

selecting destination data parameters that remain consistent throughout a network traffic session;
classifying incoming network traffic based upon the selected destination data parameters;
ordering the incoming traffic according to at least one destination data parameter comprised within the incoming network traffic using a precedence table;
determining a destination service module for the incoming network traffic;
routing the incoming network traffic.

14. The method of claim 13, further comprising hashing the destination data.

15. The method of claim 13, wherein the incoming network traffic is routed to one of a plurality of service modules.

16. The method of claim 15, wherein the data packets are routed from the one of the plurality of service modules to an egress network processing unit.

17. The method of claim 15, wherein the incoming network traffic is load balanced amount the plurality of service modules.

18. The method of claim 15, wherein the precedence table comprises information related to services and destination information.

19. The method of claim 15, wherein the destination data parameters comprise the destination address of a packet.

20. The method of claim 15, wherein the destination data parameters comprise the destination port of a packet.

* * * * *